(12) United States Patent
Basu et al.

(10) Patent No.: US 7,596,141 B2
(45) Date of Patent: Sep. 29, 2009

(54) PACKET CLASSIFICATION USING ENCODED ADDRESSES

(75) Inventors: Subhayu Basu, Bangalore (IN); Uday R Naik, Fremont, CA (US); Utpal Barman, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 11/171,926

(22) Filed: Jun. 30, 2005

(65) Prior Publication Data

US 2007/0008962 A1    Jan. 11, 2007

(51) Int. Cl.
*H04L 12/28* (2006.01)
(52) U.S. Cl. .................... 370/392; 370/395.2
(58) Field of Classification Search ........ 370/379, 370/382, 389, 392, 393, 409, 432, 471, 474
See application file for complete search history.

(56) References Cited

U.S. PATENT DOCUMENTS

| | | | | |
|---|---|---|---|---|
| 6,226,686 B1 * | 5/2001 | Rothschild et al. | ......... | 709/245 |
| 6,732,247 B2 * | 5/2004 | Berg et al. | ............... | 711/169 |
| 7,171,568 B2 * | 1/2007 | Dayan et al. | .............. | 713/300 |
| 7,257,572 B2 * | 8/2007 | Eldar | ........................ | 707/3 |
| 7,325,059 B2 * | 1/2008 | Barach et al. | ............... | 709/225 |
| 2003/0053448 A1 * | 3/2003 | Craig et al. | ................. | 370/353 |
| 2004/0230696 A1 * | 11/2004 | Barach et al. | ............... | 709/238 |
| 2005/0254502 A1 * | 11/2005 | Choi | .................... | 370/395.32 |
| 2005/0271063 A1 * | 12/2005 | Yokoyama | ............ | 370/395.54 |
| 2005/0283604 A1 * | 12/2005 | Deshpande et al. | ......... | 713/160 |
| 2006/0002312 A1 * | 1/2006 | Delattre et al. | .............. | 370/254 |
| 2006/0015648 A1 * | 1/2006 | Lappin et al. | ............... | 709/246 |
| 2006/0104286 A1 * | 5/2006 | Cheriton | ................ | 370/395.32 |
| 2006/0114876 A1 * | 6/2006 | Kalkunte | .................... | 370/341 |

OTHER PUBLICATIONS

Deering, S., et al., "Internet Protocol, Version 6 (IPv6) Specification", *Network Working Group Request for Comments: 2460 Obsoletes: 1883 Category: Standards Track*, (Dec. 1998),1-39.

Hinden, R., et al., "Internet Protocol Version 6 (IPv6) Addressing Architecture", *Network Working Group Request for Comments: 3513 Obsoletes: 2373 Category: Standards Track*, (Apr. 2003),1-26.

\* cited by examiner

*Primary Examiner*—Kwang B Yao
*Assistant Examiner*—Kenan Cehic
(74) *Attorney, Agent, or Firm*—Caven & Aghevli LLC

(57) ABSTRACT

Techniques that may be utilized in a multiprocessor computing system are described. In one embodiment, one or more addresses (such as source and/or destination addresses) of a received packet are encoded to reduce the size of the addresses and the encoded one or more addresses are utilized to classifying the received packet.

23 Claims, 11 Drawing Sheets

CONCATENATE
ENCODING TYPE CODE, 2
ZEROS, AND IP[0:63]
1402

PACKET CLASSIFICATION USING ENCODED ADDRESSES

BACKGROUND

Communication networks route data packets from a source to a destination using one or more networking protocols, such as the Internet protocol (IP). One example of communication networks that utilizes the Internet protocol is the Internet, which enables communication between computing devices that may be spread throughout the world. As a result, the popularity of the Internet has been steadily increasing.

Generally, to connect to an IP network, each device utilizes an IP address to identify it to other devices that are present on that network. Hence, a larger number of IP addresses are needed as an increasing number of devices are connected to computer networks, such as the Internet. However, expanding the number of IP addresses may create problems for the current network traffic management devices. For example, the typical layer 2 and layer 3 devices (such as routers or bridges) not only forward frames/packets based on the destination address, but also classify the packets based on various fields present in the packet in accordance with some classification rule(s). The classification is generally done by using a ternary content addressable memory (TCAM). The maximum width of the TCAM depends upon the sum of all the packet fields that are to be used for classification. Therefore, as the address size of each IP packet increases (e.g., due to increased number of addressable nodes), wider TCAMs may have to be utilized. The TCAMs are specialized devices which can be costly, both from a manufacturing perspective as well as integrated circuit (IC) die real estate perspective. Also, a wider TCAM may consume additional power or generate more heat when in operation. Hence, as the size of each IP packet increases, the monetary and technical costs of TCAMs utilized in network traffic management devices may also increase.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments of the invention may be practiced without the specific details. In other instances, well-known methods, procedures, components, and circuits have not been described in detail so as not to obscure the particular embodiments of the invention.

Figure 1:
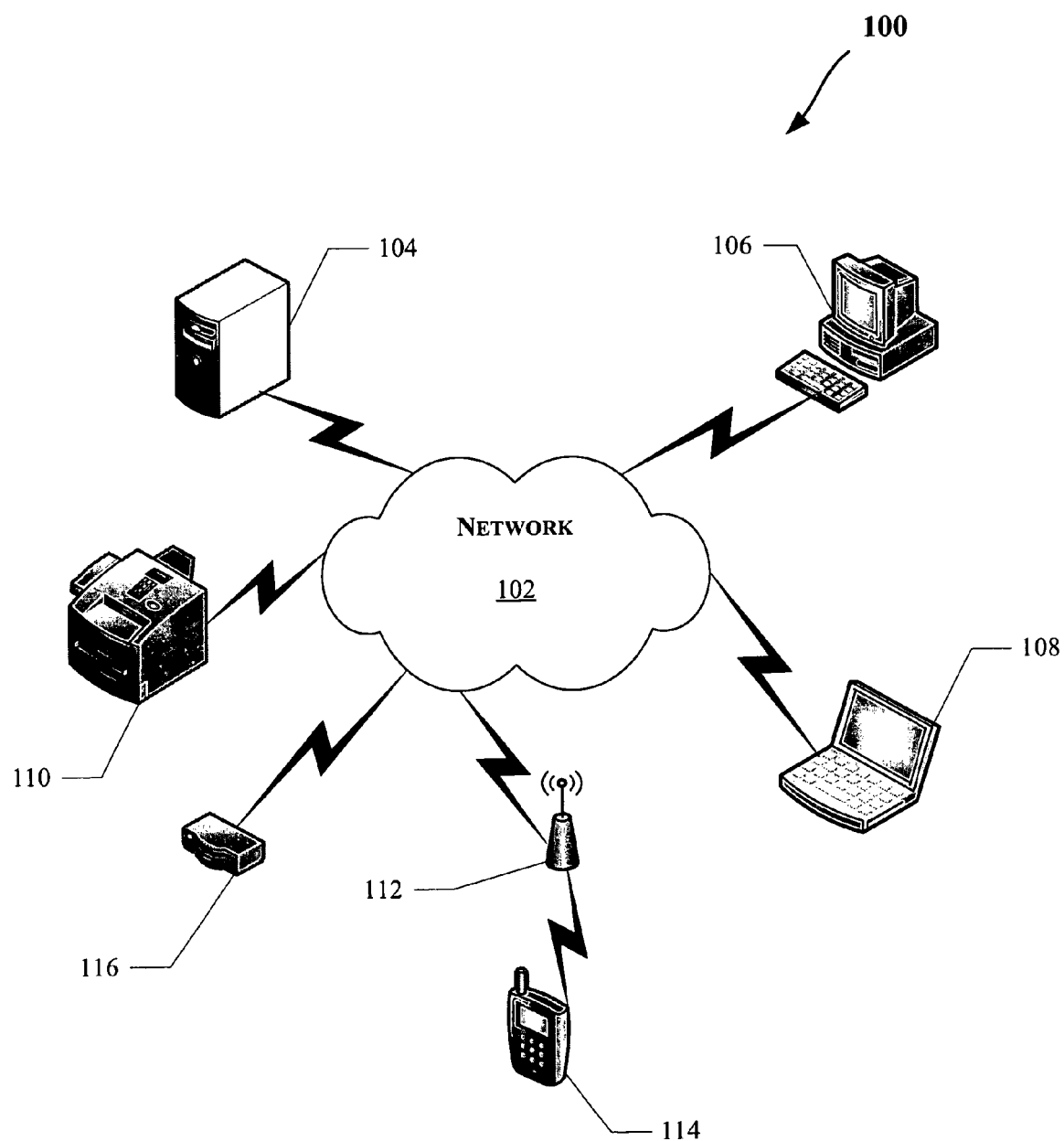
FIG. 1 illustrates various components of an embodiment of a networking environment, which may be utilized to implement various embodiments discussed herein.

FIG. 1 illustrates various components of an embodiment of a networking environment 100, which may be utilized to implement various embodiments discussed herein. The environment 100 includes a network 102 to enable communication between various devices such as a server computer 104, a desktop computer 106 (e.g., a workstation or a desktop computer), a laptop (or notebook) computer 108, a reproduction device 110 (e.g., a network printer, copier, facsimile, scanner, all-in-one device, or the like), a wireless access point 112, a personal digital assistant or smart phone 114, a rack-mounted computing system (not shown), or the like. The network 102 may be any suitable type of a computer network including an intranet, the Internet, and/or combinations thereof.

The devices 104-114 may be coupled to the network 102 through wired and/or wireless connections. Hence, the network 102 may be a wired and/or wireless network. For example, as illustrated in FIG. 1, the wireless access point 112 may be coupled to the network 102 to enable other wireless-capable devices (such as the device 114) to communicate with the network 102. Alternatively, the network 102 may support wireless communication without the access point 114, e.g., through a wireless router or hub. Additionally, the environment 100 may include one or more traffic management device(s) 116, e.g., to route, classify, and/or otherwise manipulate data (for example, in form of packets). In an embodiment, the traffic management device 116 may be coupled between the network 102 and the devices 104-114. Hence, the traffic management device 116 may be a switch, a router, or the like that manages the traffic between the devices 104-114. In one embodiment, the wireless access point 112 may include traffic management capabilities (e.g., as provided by the traffic management devices 116).

The network 102 may utilize any suitable communication protocol such as Ethernet, Fast Ethernet, Gigabit Ethernet, wide-area network (WAN), fiber distributed data interface (FDDI), Token Ring, leased line (such as T1, T3, optical carrier 3 (OC3), or the like), analog modem, digital subscriber line (DSL and its varieties such as high bit-rate DSL (HDSL), integrated services digital network DSL (IDSL), or the like), asynchronous transfer mode (ATM), cable modem, and/or FireWire.

Wireless communication through the network 102 may be in accordance with one or more of the following: wireless local area network (WLAN), wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), or the like. Moreover, network communication may be established by internal network interface devices (e.g., present within the same physical enclosure as a computing system) or external network interface devices (e.g., having a separated physical enclosure and/or power supply than the computing system it is coupled to) such as a network interface card (NIC).

Figure 2:
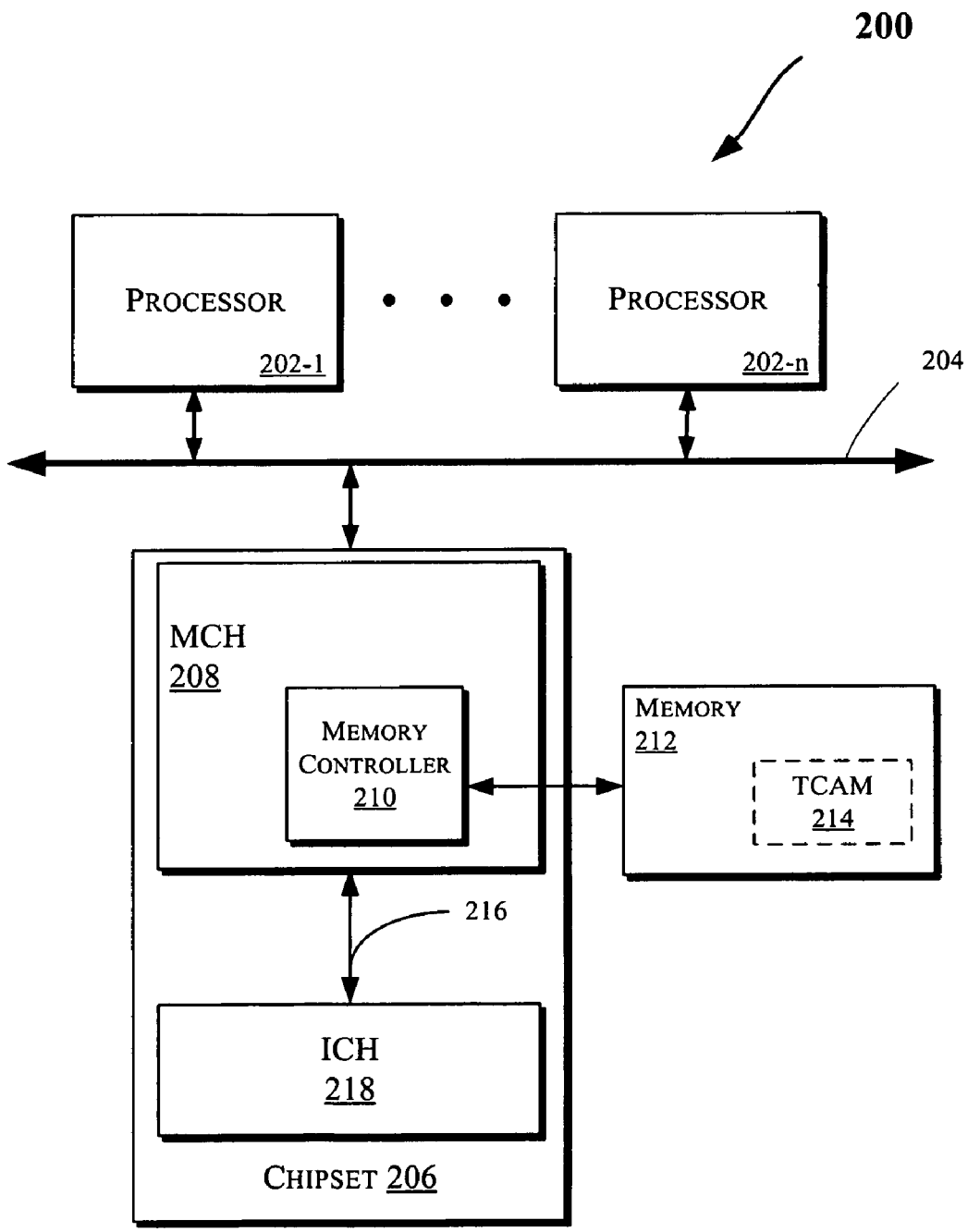
FIG. 2 illustrates a block diagram of a computing system in accordance with an embodiment of the invention.

FIG. 2 illustrates a block diagram of a computing system 200 in accordance with an embodiment of the invention. The computing system 200 may be utilized to implement one or more of the devices (104-116) discussed with reference to FIG. 1. The computing system 200 includes one or more processors 202 (e.g., 202-1 through 202-n) coupled to an interconnection network (or bus) 204. The processors (202) may be any suitable processor such as a general purpose processor, or the like (including a reduced instruction set computer (RISC) processor or a complex instruction set computer (CISC)). Moreover, the processors (202) may have a single or multiple core design. The processors (202) with a multiple core design may integrate different types of processor cores on the same integrated circuit (IC) die. Also, the processors (202) with a multiple core design may be implemented as symmetrical or asymmetrical multiprocessors. In one embodiment, the processors (202) may be network processors with a multiple-core design which includes one or more general purpose processor cores (e.g., microengines (MEs)) and a core processor (e.g., to perform various general tasks within the given processor).

A chipset 206 may also be coupled to the interconnection network 204. The chipset 206 includes a memory control hub (MCH) 208. The MCH 208 may include a memory controller 210 that is coupled to a memory 212 that may be shared by the processors 202. The memory 212 may store data and sequences of instructions that are executed by the processors 202, or any other device included in the computing system 200. The system 200 may include content addressable memory (CAM), such a ternary content addressable memory (TCAM) 214. Other types of addressable memory may also be used. The TCAM 214 may allow the system 200 to operate as a network processor. Such a network processor may be utilized in the traffic management devices 116 in one embodiment. Alternatively, the TCAM 214 may be implemented as a separate or external device (or coprocessor), rather than being part of the memory 212 (such as illustrated in FIG. 2). For example, the TCAM 214 may be directly accessible by (or coupled to) the processors 202 and/or through the MCH 208. The TCAM 214 may provide table lookup capabilities for routing packets and/or ACL (access control list) support, e.g., by the traffic management devices 116 in the environment 100 of FIG. 1. Also, the TCAM 214 may provide for multiple search tables within the same device.

In one embodiment, the memory 212 and/or the TCAM 214 may include one or more volatile storage (or memory) devices such as random access memory (RAM), dynamic RAM (DRAM), synchronous DRAM (SDRAM), static RAM (SRAM), or the like. Moreover, the memory 212 and/or the TCAM 214 may include nonvolatile memory (in addition to or instead of volatile memory). Hence, the computing system 200 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 228), a floppy disk, a compact disk ROM (CD-ROM), a digital versatile disk (DVD), flash memory, a magneto-optical disk, or other types of nonvolatile machine-readable media suitable for storing electronic instructions and/or data. Additionally, multiple storage devices (including volatile and/or nonvolatile memory discussed above) may be coupled to the interconnection network 204.

A hub interface 216 may couple the MCH 208 to an input/output control hub (ICH) 218. In an embodiment, the nonvolatile memory discussed herein may be coupled to the computing system 200 through the ICH 218. Moreover, the ICH 218 may provide an interface to input/output (I/O) devices coupled to the computing system 200. For example, the ICH 218 may be coupled to a peripheral component interconnect (PCI) bus to provide access to various peripheral devices. Other types of topologies or buses may also be utilized. Examples of the peripheral devices coupled to the ICH 218 may include integrated drive electronics (IDE) or small computer system interface (SCSI) hard drive(s), universal serial bus (USB) port(s), a keyboard, a mouse, parallel port (s), serial port(s), floppy disk drive(s), digital output support (e.g., digital video interface (DVI)), one or more audio devices (such as a Moving Picture Experts Group Layer-3 Audio (MP3) player), a microphone, speakers, or the like), one or more network interface devices (such as a network interface card), or the like.

Figure 3:
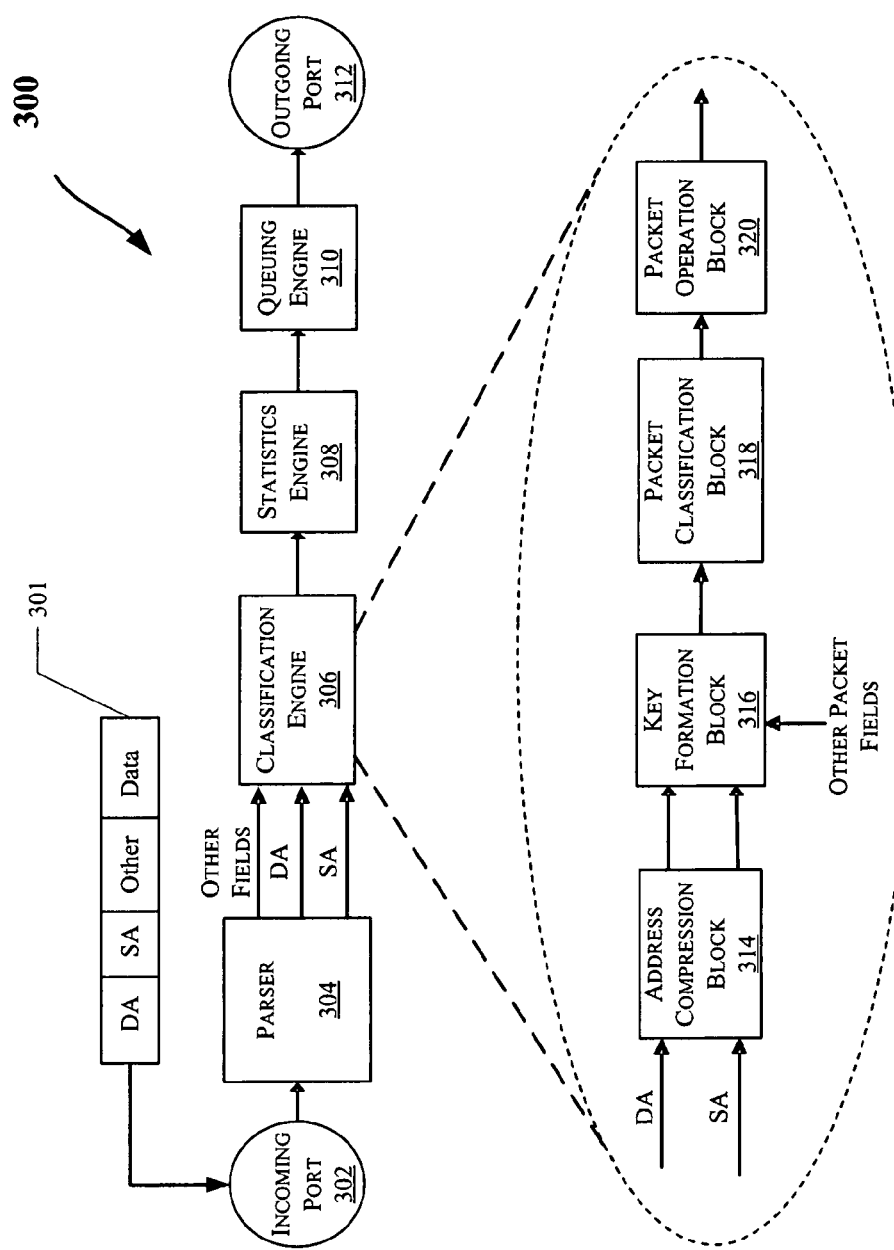
FIG. 3 illustrates an embodiment of a packet classification system.

FIG. 3 illustrates an embodiment of a packet classification system 300. The system 300 may be implemented by utilizing the computing system 200 of FIG. 2. For example, various operations discussed with reference to the system 300 may be performed by the processors 202 of FIG. 2 and/or software. Also, various data or information discussed with reference to the system 300 may be stored on the memory devices discussed with reference to FIG. 2 (such as the memory 212 and/or TCAM 214).

Additionally, the system 300 may be implemented in the traffic management devices 116 discussed with reference to FIG. 1. For example, in one embodiment, the system 300 may be utilized to encode one or more address fields of a data packet 301 prior to classifying the packet. For example, IP version 6 (IPv6) described by the Internet Engineering Task Force (IETF), Request for Comments 2460 (December 1998) and 3513 (April 2003), include an addressing architecture that provides expanded IP addressing capability. The packet address fields for IPv6 include 16 bytes or 128 bits (approximately $2^{128}$ addressable devices), compared with the 4 bytes or 32 bits (approximately 232 addressable devices) supported by the previous IP version 4, as described by the (IETF), Request for Comments 791, September 1981. Hence, the system 300 may be utilized to encode (e.g., reduce or compress) the address fields of IPv6 packets prior to classifying the packets. In one embodiment, the system 300 may allow for a reduction in size of the TCAM 214 of FIG. 2 when classifying IPv6 packets, for example, instead of providing a TCAM that is a full 128 bits wide.

The system 300 may receive the data packet 301 (e.g., from a network such as the networking environment 100 of FIG. 1, or various devices 104-114 coupled to the environment 100) at an incoming port 302. The data packet 301 may be received through a network interface device such as discussed with reference to FIG. 2. A parser 304 coupled to the incoming port may parse the received packet and identify the relevant packet fields including the destination address (DA), the source address (SA), or other packet fields (such as quality-of-service (QoS) information). As illustrated in FIG. 3, the packet 301 may include other fields in various embodiments such as a data field, a protocol field, a source port, a destination port, or the like.

The parser 304 may be coupled to a classification engine 306 that classifies the received packet 301 based on the packet fields including the destination and/or source address fields. The classification engine 306 may be coupled to a statistics engine 308 that may collect various statistics regarding the classified packet. The classified packet may then pass to a queuing engine 310 that is coupled to the statistics engine 308, e.g., to queue the classified packet for sending to an outgoing port 312. From the outgoing port 312 the classified received packet (301) may be sent to a computer network, or devices coupled to a computer network (such as the networking environment 100 of FIG. 1 or devices 104-114 of FIG. 1).

As illustrated in FIG. 3, the classification engine 306 may include an address compression block 314 to encode (e.g., compress or otherwise reduce the size of) the destination and/or source address fields of the received packet 301. The address compression block 314 may be coupled to a key formation block 316. The key formation block 316 may receive other data such as other packet fields of the received packet 301. The key formation block 316 may utilize the encoded source and destination addresses along with the other packet fields to form a search key for looking up classification rule results in a classification database (that may be stored in any suitable memory device, such as the memory 212 and/or TCAM 214 of FIG. 2).

The classification engine 306 may further include a packet classification block 318 to classify the encoded packet, e.g., based on the key formed by the key formation block 316. The classification may be used to provide value added services such as: (a) access control (e.g., by utilizing an ACL); (b) metering; (c) quality of service; (d) accounting; (e) policy based forwarding; (f) mirroring; etc. For IP packets, the classification rules may contain one or more of the layer 3 or higher layer fields such as: (a) source address/network; (b) destination address/network; (c) higher layer protocol (e.g., transmission control protocol (TCP) or user datagram protocol (UDP)); (d) TCP/UDP source port number; or (e) TCP/UDP destination port number (5 tuple). As all of these fields may not be required to classify all the packets, depending on the classification rule, some of the fields or portion of some of the fields may be masked while matching a packet for classification. Hence, in one embodiment, the entries utilized by the address compression block 314 may depend upon the classification rules set up in the packet classification block 318, as will be further discussed herein, e.g., with reference to FIGS. 4-5. Also, the address compression block 314 and the packet classification block 318 may be coupled to one or more TCAMs (such as the TCAM 214 of FIG. 2). In one embodiment, two TCAMs may be utilized, e.g., one for compression (314) and another for classification (318).

The classification engine 306 may also include a packet operation block 320 coupled to the packet classification block 318 to perform one or more operations on the classified packet prior to passing it to other components of the system 300, such as the statistics engine 308. For example, the packet operation block 320 may perform one or more tasks such as translation, encryption, error checking, one or more of the value added operations discussed with reference to the packet classification block 318, or the like on the classified packet. Also, the system 300 may include more than one classification engine, such as an ingress classification engine and/or an egress classification engine (not shown) to perform one or more tasks such as encoding, translation, encryption, error checking, or the like on the received packet. Furthermore, a forwarding engine (not shown) may be utilized to forward the received packet (301) from an ingress classification engine to an egress classification engine.

Figure 4:
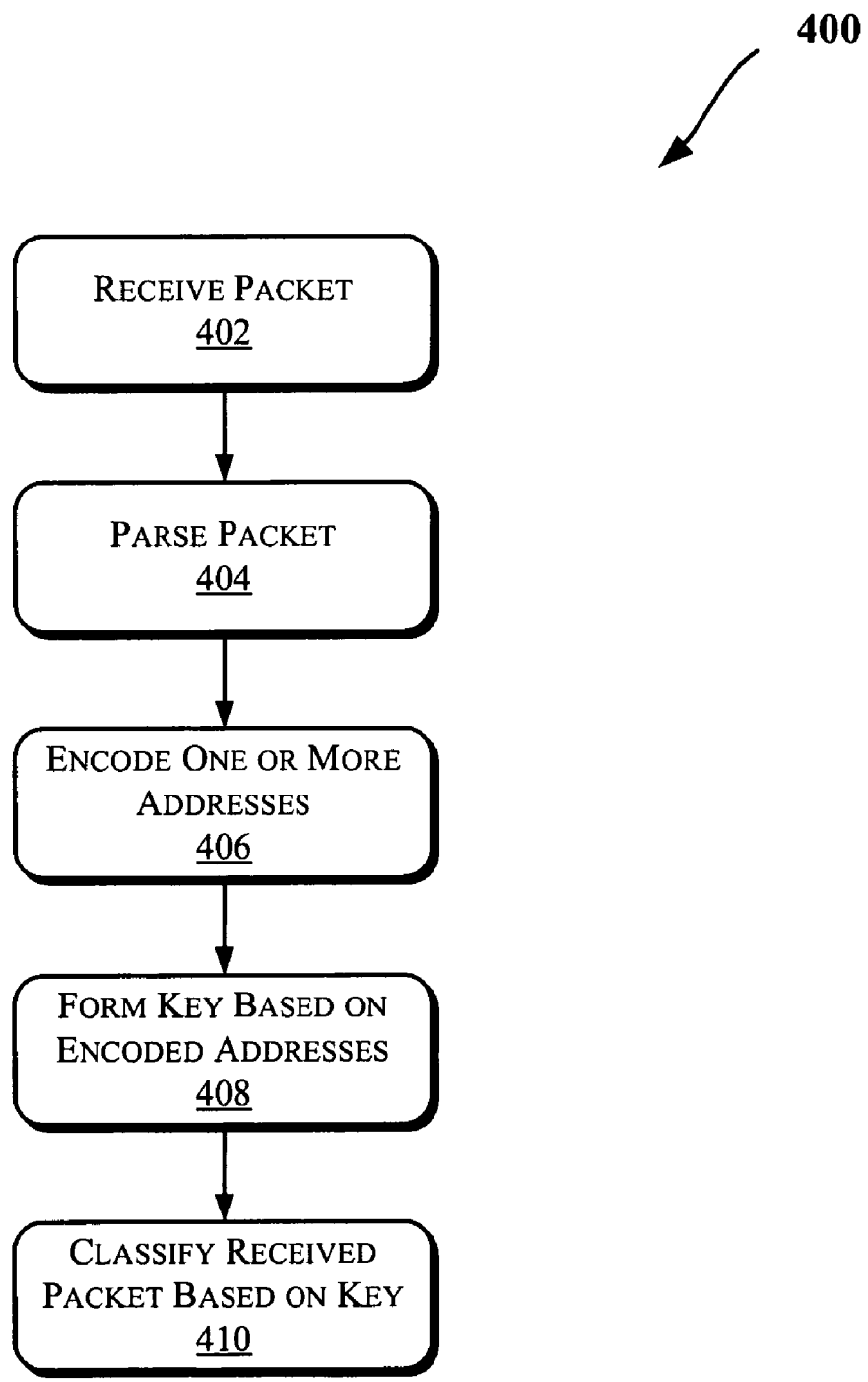
FIG. 4 illustrates an embodiment of a method for classifying a packet.

FIG. 4 illustrates an embodiment of a method 400 for classifying a packet. In one embodiment, the system 300 of FIG. 3 may be utilized to perform one or more operations discussed with reference to the method 400. After a packet (e.g., the packet 301 of FIG. 3) is received (402), e.g., by the incoming port 302 of FIG. 2, the packet may be parsed (404), for example, by the parser 304 of FIG. 2. The parsing may identify one or more relevant packet fields including the destination address (DA), the source address (SA), or other packet fields (such as quality-of-service (QoS) information). Also, the packet may be a unicast or multicast packet, as will be further discussed with reference to FIGS. 5-9. A unicast address generally indicates that a packet is to be delivered to the interface identified by that address. A multicast address generally indicates that a packet is to be delivered to all interfaces identified by that address. The packet may include other fields in various embodiments such as a data field, a protocol field, a source port, a destination port, or the like.

The one or more addresses (e.g., a source address and a destination address of a received packet (402)) may be encoded or compressed (406), e.g., by the address compression block 314 of FIG. 3. Various embodiments for performing the encoding (406) will be further discussed herein, e.g., with reference to FIGS. 5-17. The encoded addresses (and other unencoded fields of the received packet) may be utilized to form a search key (408), e.g., for looking up classification rule results in a classification database (that may be stored in any suitable memory device, such as the memory 212 and/or TCAM 214 of FIG. 2). The stage 408 may be performed by the key formation block 316 of FIG. 3 in one embodiment. The key (408) may be utilized to classify the packet (410). In one embodiment, the packet classification block 318 may be utilized the key (408) to classify the received packet (301).

Figure 5:
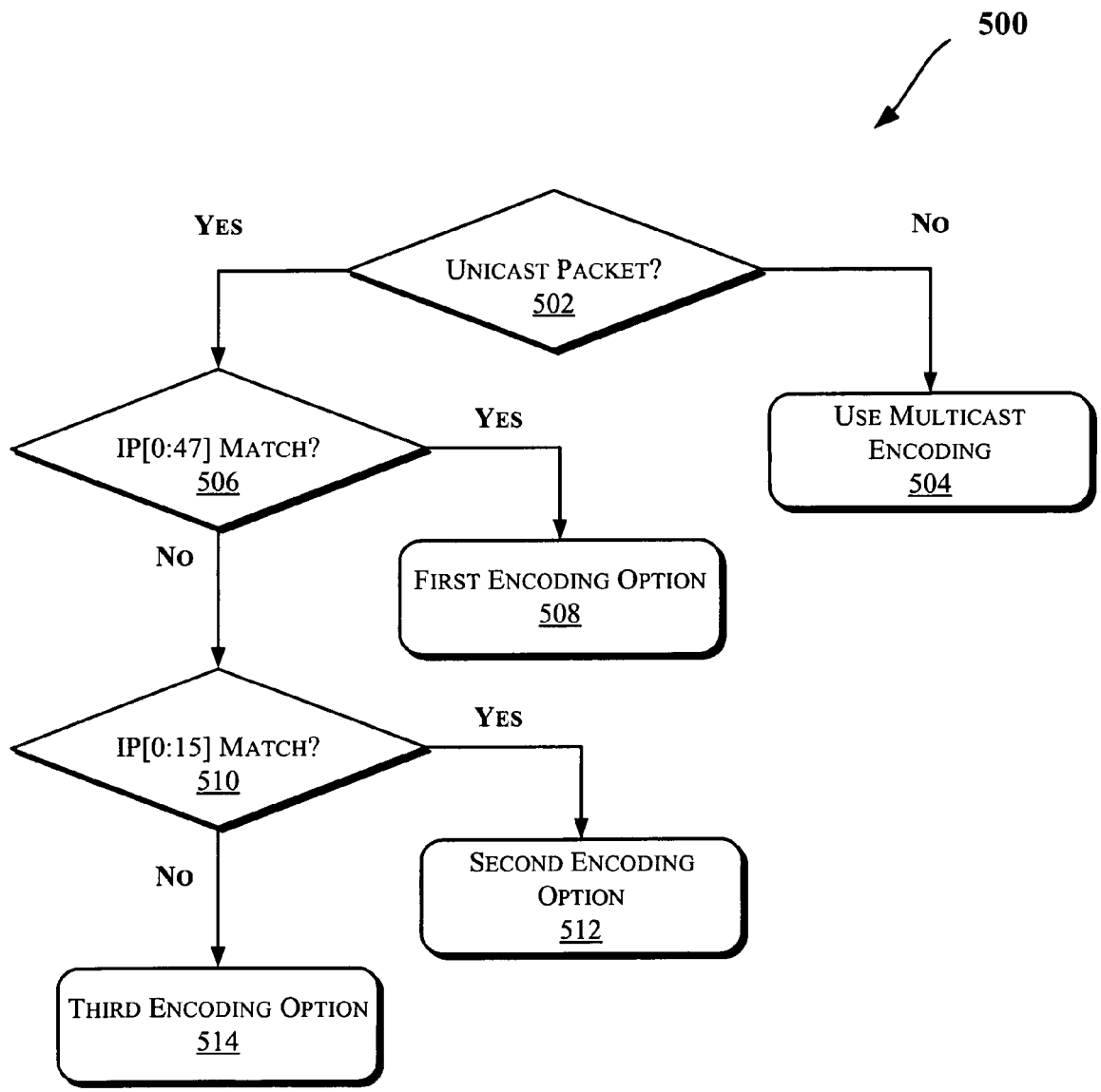
FIG. 5 illustrates an embodiment of a method for encoding a packet.

FIG. 5 illustrates an embodiment of a method 500 for encoding a packet. In one embodiment, the system 300 of FIG. 3 may be utilized to perform one or more operations discussed with reference to the method 500. Also, the method 500 may perform one or more tasks corresponding to the encoding stage 406 of FIG. 4. The method 500 determines whether the received packet (e.g., the packet 301 of FIG. 3) is a unicast or a multicast packet (502). If the packet is multicast, multicast encoding is utilized (504) to encode one or more addresses of the packet, as will be further discussed with reference to FIGS. 16-17.

If the packet is unicast (502), a stage 506 determines whether the first 48 bits of the address match an address derived from a classification rule. As discussed with reference to FIG. 3, the entries utilized by the address compression block 314 may depend upon the classification rules, e.g., set up in the packet classification block 318. Hence, a classification rule may be analyzed to determine what address a unicast address is to be matched against (e.g., which one of the encoding options discussed with respect to FIG. 5 is to be utilized). For example, if a classification rule requires that all traffic coming from a subnetwork with subnet prefix N1 and destined to a host H2 in a subnetwork N2 is to be blocked, the unicast source address may be matched against the address of N1, whereas the unicast destination address may be matched against the address of N2 and/or H2.

If the first 48 bits match (506), a first encoding option may be utilized (508). Various embodiments of the first encoding option will be further discussed with reference to FIGS. 10-11. If the first 48 bits do not match (506), a stage 510 determines whether the first 16 bits match. If the first 16 bits match, a second encoding option may be utilized (512). Various embodiments of the second encoding option will be further discussed with reference to FIGS. 12-13. Alternatively, if the first 16 bits do not match (510), a third encoding option may be utilized (514). Various embodiments of the third encoding option will be further discussed with reference to FIGS. 14-15.

Figure 6:
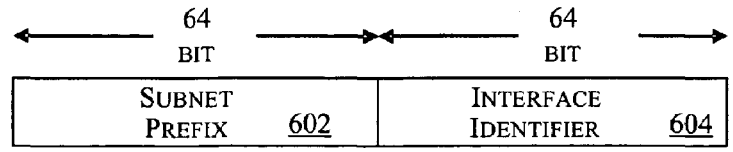
FIGS. 6-9 illustrate various unicast and multicast address formats that may be utilized to implement some embodiments of the invention.
Figure 7:
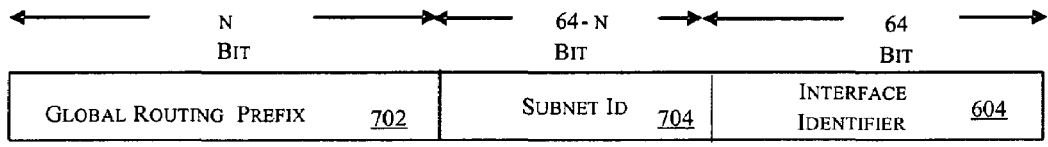
Figure 8:
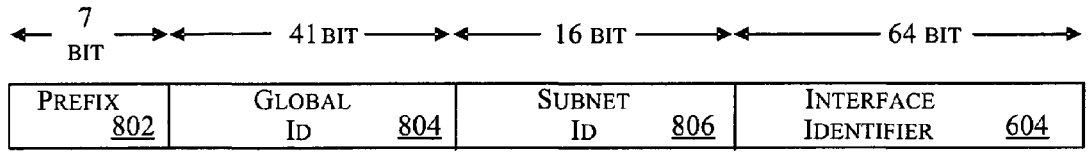

FIGS. 6-8 illustrate various unicast address formats that may be utilized to implement some embodiments of the invention. The unicast address formats of FIGS. 6-8 may be IPv6 unicast addresses in some embodiments. FIG. 6 illustrates an embodiment of a unicast address that may include a subnet prefix 602 that identifies a specific network to which the addressed device belongs and an interface identifier 604 that identifies the addressed device among the devices in the network. The interface identifier 604 may be unique for all the devices that belong to the same network. For unicast addresses that do not start with 000, the network prefix 602 may be 64 bits and the interface identifier 604 may also be 64 bits. FIG. 7 illustrates an embodiment of a global unicast address that may include a global routing prefix 702 (which may be hierarchical and identify a site), a subnet identifier (ID) 704 (e.g., to identify a subnet/link within the site), and/or the interface identifier 604. As illustrated in FIG. 7, the field 702 may be n bits, field 704 may be 64-n bits, and the field 604 may be 64 bits.

FIG. 8 illustrates an embodiment of a local unicast address that may include a prefix 802, a global ID (e.g., to create a globally unique prefix) 804, a subnet ID 806, and/or the interface identifier 604. As illustrated in FIG. 8, the field 802 may be 7 bits, field 804 may be 41 bits, the subnet ID may be 16 bits, and the field 604 may be 64 bits. Local unicast addresses may be defined for use within a site, and private connectivity across a number of sites. The prefix 802 may be FC00::/7 to identify a local unicast address, where "::" may indicate one or more groups of 16 bits of zeros. The "::" may appear once in an address. Also, the "::" may be used to compress leading or trailing zeros in an address. The subnet ID 806 may identify a subnet within the site.

Figure 9:
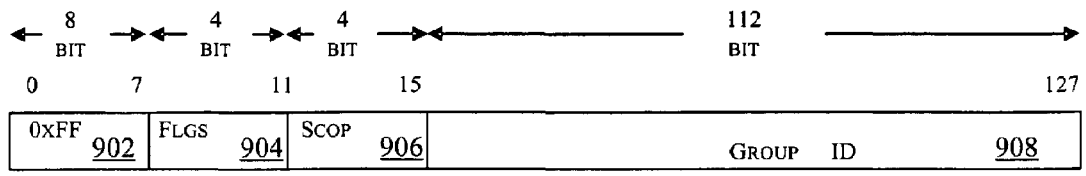

FIG. 9 illustrates an embodiment of a multicast address format that may be utilized to implement some embodiments of the invention. The multicast address may start with 0xFF (902). The Flgs field 904 and Scop field 906 may be each 4 bits wide. The Scop field 906 may indicate the scope of the multicast address and the Flgs field 904 may include data regarding the source of the multicast address definition. The multicast address may also include a group ID 908 to identify the multicast group within the specified scope (906). The same group ID (908) may be used in a different multicast address scope (906). As illustrated in FIG. 9, the field 902 may be 8 bits and field 908 may be 112 bits.

In some embodiment, the classification rules involving a unicast address may be either specific to a host or specific to a network. Multiple networks may also be consolidated together (e.g., all subnetworks within a site such as in a classless inter-domain routing (CIDR)) in the classification rule. In this case, bit mask of the subnet prefix (such as the prefix 602 of FIG. 6) may be used to represent the address of combined or aggregated subnetworks. The classification rules may also vary depending upon the type of action required after completing the classification. Hence, for one kind of action the requirement may be to classify based on a particular host, whereas for another kind of action the requirement may be to classify based on the network to which the previously mentioned host belongs.

Figure 10:
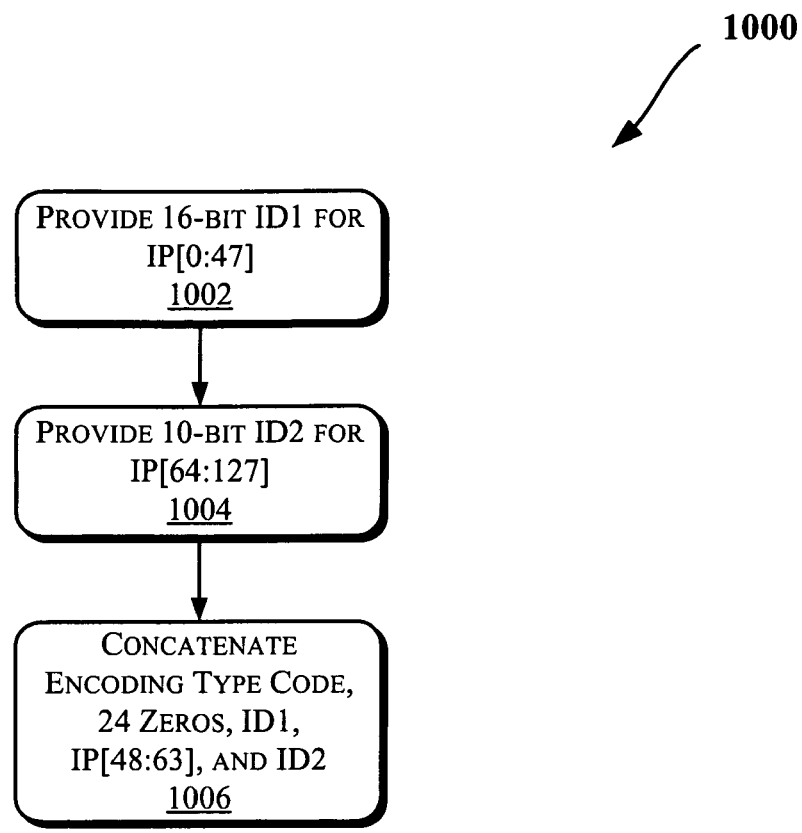
FIGS. 10, 12, 14, and 16 illustrate embodiments of methods for encoding unicast and multicast addresses.
Figure 11:
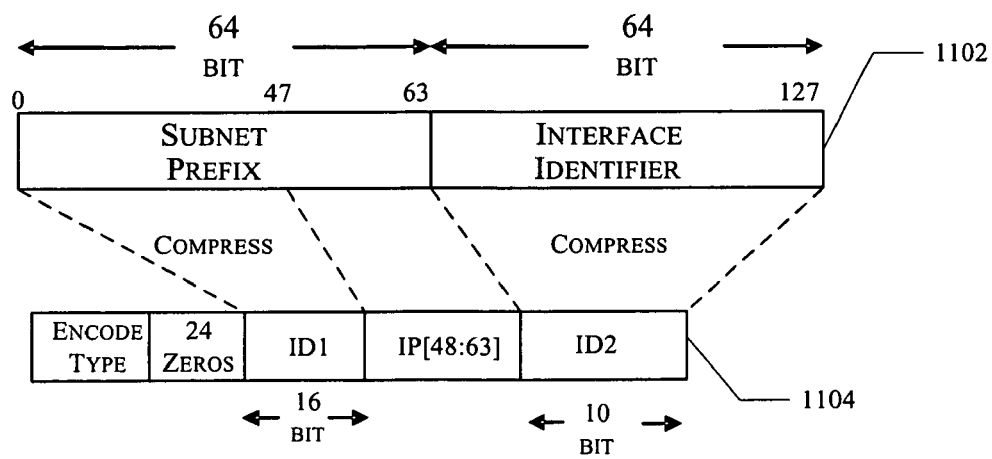
FIGS. 11, 13, 15, and 17 illustrate unicast and multicast addresses that are encoded into encoded addresses.

FIG. 10 illustrates an embodiment of a method 1000 for encoding a unicast address. In one embodiment, the system 300 of FIG. 3 may be utilized to perform one or more operations discussed with reference to the method 1000. Also, the method 1000 may perform one or more tasks corresponding to the first encoding option 508 of FIG. 5. FIG. 11 illustrates a unicast address 1102 that is encoded into an encoded address 1104 by performing the method 1000, according to an embodiment.

The method 1000 may provide or allocate a 16-bit identifier (ID1) for bits 0 through 47 of the address 1102 (1002). The method 1000 may also provide or allocate a 10-bit identifier (ID2) for bits 64 through 127 of the address 1102 (1004). The encoded address 1104 may be generated by concatenating (1006), an encoding type code (which may be 2 bits in one embodiment), 24 zeros, ID1, bits 48 through 63 of the address 1102, and ID2.

Figure 12:
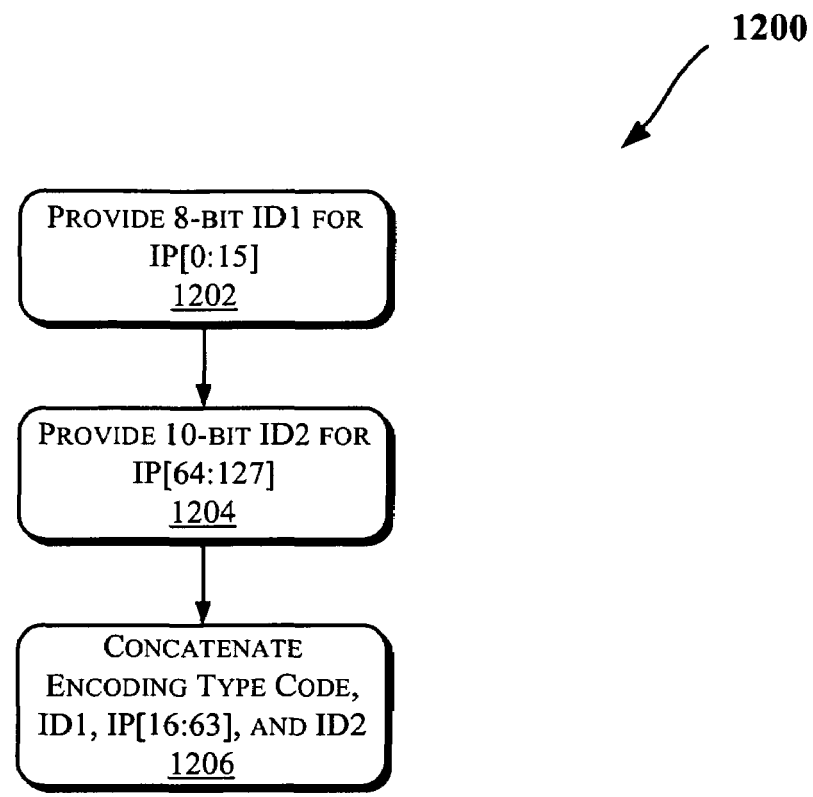
Figure 13:
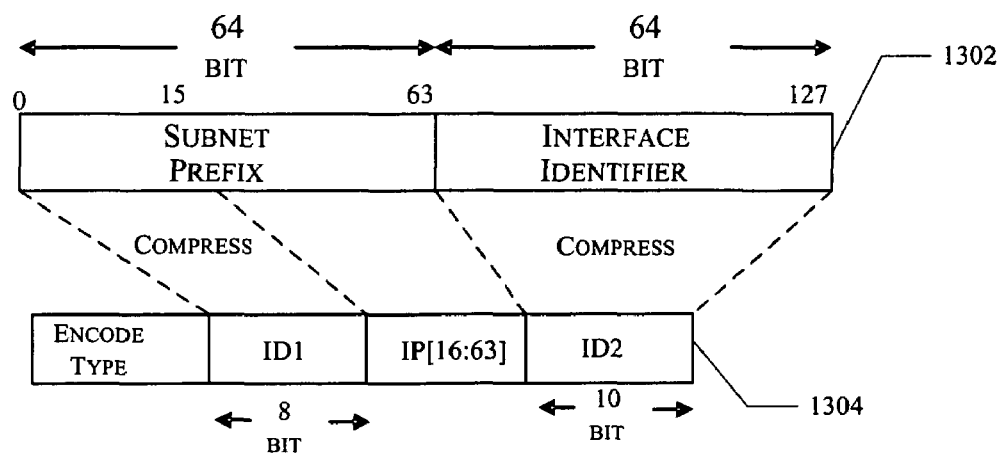

FIG. 12 illustrates an embodiment of a method 1200 for encoding a unicast address. In one embodiment, the system 300 of FIG. 3 may be utilized to perform one or more operations discussed with reference to the method 1200. Also, the method 1200 may perform one or more tasks corresponding to the second encoding option 512 of FIG. 5. FIG. 13 illustrates a unicast address 1302 that is encoded into an encoded address 1304 by performing the method 1200, according to an embodiment.

The method 1200 may provide or allocate an 8-bit identifier (ID1) for bits 0 through 15 of the address 1302 (1202). The method 1200 may also provide or allocate a 10-bit identifier (ID2) for bits 64 through 127 of the address 1302 (1204). The encoded address 1304 may be generated by concatenating (1206), an encoding type code (which may be 2 bits in one embodiment), ID1, bits 16 through 63 of the address 1302, and ID2.

Figures 14, 15:
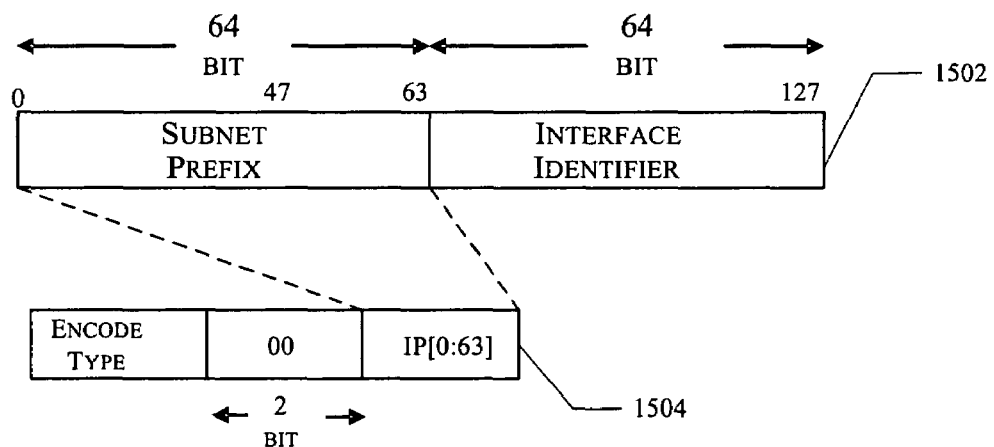

FIG. 14 illustrates an embodiment of a method 1400 for encoding a unicast address. In one embodiment, the system 300 of FIG. 3 may be utilized to perform one or more operations discussed with reference to the method 1400. Also, the method 1400 may perform one or more tasks corresponding to the third encoding option 514 of FIG. 5. FIG. 15 illustrates a unicast address 1502 that is encoded into an encoded address 1504 by performing the method 1400, according to an embodiment. The method 1400 may provide the encoded address 1504 by concatenating (1402), an encoding type code (which may be 2 bits in one embodiment), 2 zeros, and bits 0 through 63 of the address 1502.

Figure 16:
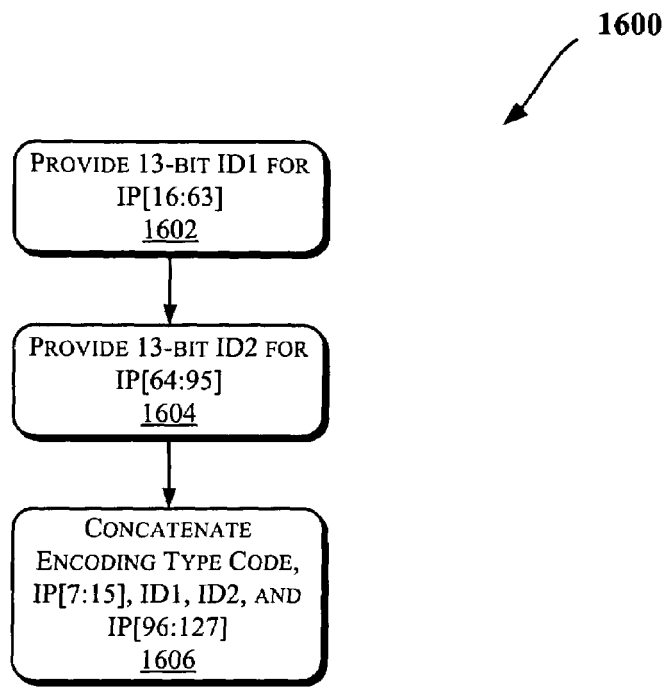
Figure 17:
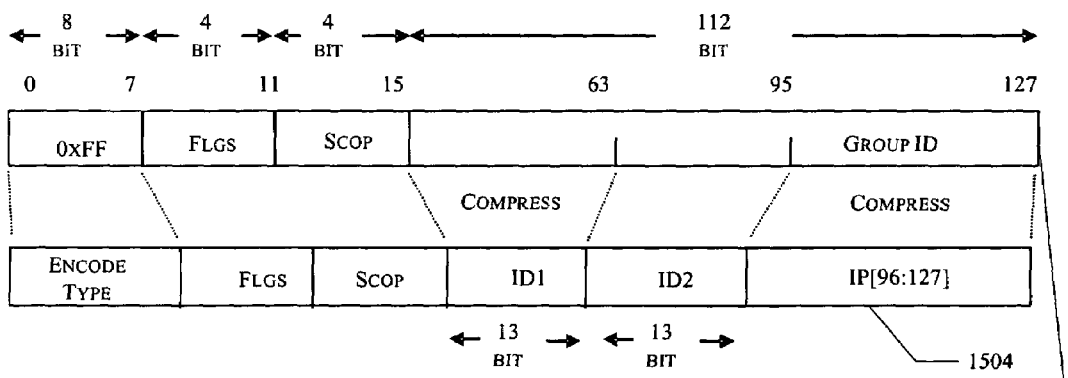

FIG. 16 illustrates an embodiment of a method 1600 for encoding a multicast address. In one embodiment, the system 300 of FIG. 3 may be utilized to perform one or more operations discussed with reference to the method 1600. Also, the method 1600 may perform one or more tasks corresponding to the multicast encoding 504 of FIG. 5. FIG. 17 illustrates a multicast address 1702 that is encoded into an encoded address 1704 by performing the method 1600, according to an embodiment.

The method 1600 may provide or allocate a 13-bit identifier (ID1) for bits 16 through 63 of the address 1702 (1602). The method 1600 may also provide or allocate a 13-bit identifier (ID2) for bits 64 through 95 of the address 1702 (1604). The encoded address 1704 may be generated by concatenating (1606), an encoding type code (which may be 2 bits in one embodiment), bits 7 through 15, ID1, ID2, and bits 96 through 127 of the address 1702.

In one embodiment, the encoded addresses 1102, 1302, 1502, and 1702, provided by the methods 1000, 1200, 1400, and 1600, respectively, may be 68 bits wide. Hence, for IPv6, a content addressable memory (e.g., the TCAM 214 of FIG. 2) may store addresses that are 68 bits wide instead of 128 bits wide. Such an implementation may provide for a reduced gate count on an IC that performs the operations discussed with reference to FIGS. 1-17 and/or provide for the capability to handle additional classification rules without increasing the gate count.

Additionally, in one embodiment, the encoding type codes (which are concatenated to generate the encoded addresses 1102, 1302, 1502, and 1702) may be utilized (e.g., by the processors 202 of FIG. 2) in determining whether to modify the address masking fields (e.g., the bits that are matched during the stages 506 and/or 510 of FIG. 5) utilized during classification of an encoded packet (e.g., by the packet classification block 318 of FIG. 3). Furthermore, as discussed with reference to FIG. 3, the entries used by the address compression block 314 may depend upon the classification rules set up by the packet classification block 318. The following are some examples:

a) Classification Rule 1—Classify all traffic coming from a subnetwork 2001:A:B:C::/64, and destined to a host 2001:1:2:3:4:5:6:7/128—Action is do not allow this access.

b) Classification Rule 2—Classify all traffic coming from a subnetwork 2001:A:B:C::/64, and destined to the subnetwork 2001:1:2:3/64—Action is to rate limit this traffic.

c) Classification Rule 3—Classify all traffic coming from 2002:1:2/48 and destined to 2001:2:3:4::/64—Action Mirror this traffic.

For the above mentioned set of classification rules, all addresses starting with 2001::/16 may be encoded using the second encoding option discussed with reference to FIG. 12. The addresses starting with 2002::/16 may be encoded using the third encoding option discussed with reference to FIG. 14.

Assuming that the second encoding option (FIG. 12) is represented by b'01 and the third encoding option (FIG. 14) is represented by b'10 (and also assuming that ID1 is 0x5 for 2001::/16 and ID2 is 0x8 for the last 64 bits 4:5:6:7), the address representation may be as illustrated in Table 1 below in hexadecimal representation (i.e., 4 consecutive binary bits represented with equivalent hexadecimal number).

TABLE 1

Sample Original and Encoded Address Mapping

| Original Address range | Encoded Address |
|---|---|
| 2001:A:B:C::/64 | 4140028002C003000/58 |
| 2001:1:2:3::/64 | 41400040008000C00/58 |
| 2001:1:2:3:4:5:6:7/128 | 41400040008000C08/68 |
| 2002:1:2::/48 | 82002000100100000/52 |
| 2002::/16 | 82002000000000000/20 |

Hence, an IPv6 address in the range 2001:A:B:C::/64 may be encoded as 0x4140028002C003000/58. An IPv6 address in the range 2001:1:2:3::/64, except 2001:1:2:3:4:5:6:7/128, may be encoded as 41400040008000C00/58. The IPv6 address 2001:1:2:3:4:5:6:7/128 may be encoded as 41400040008000C08/68. These encoded addresses with modified mask may be used for classification, e.g., by the packet classification block 318 of FIG. 3.

Figure 18:
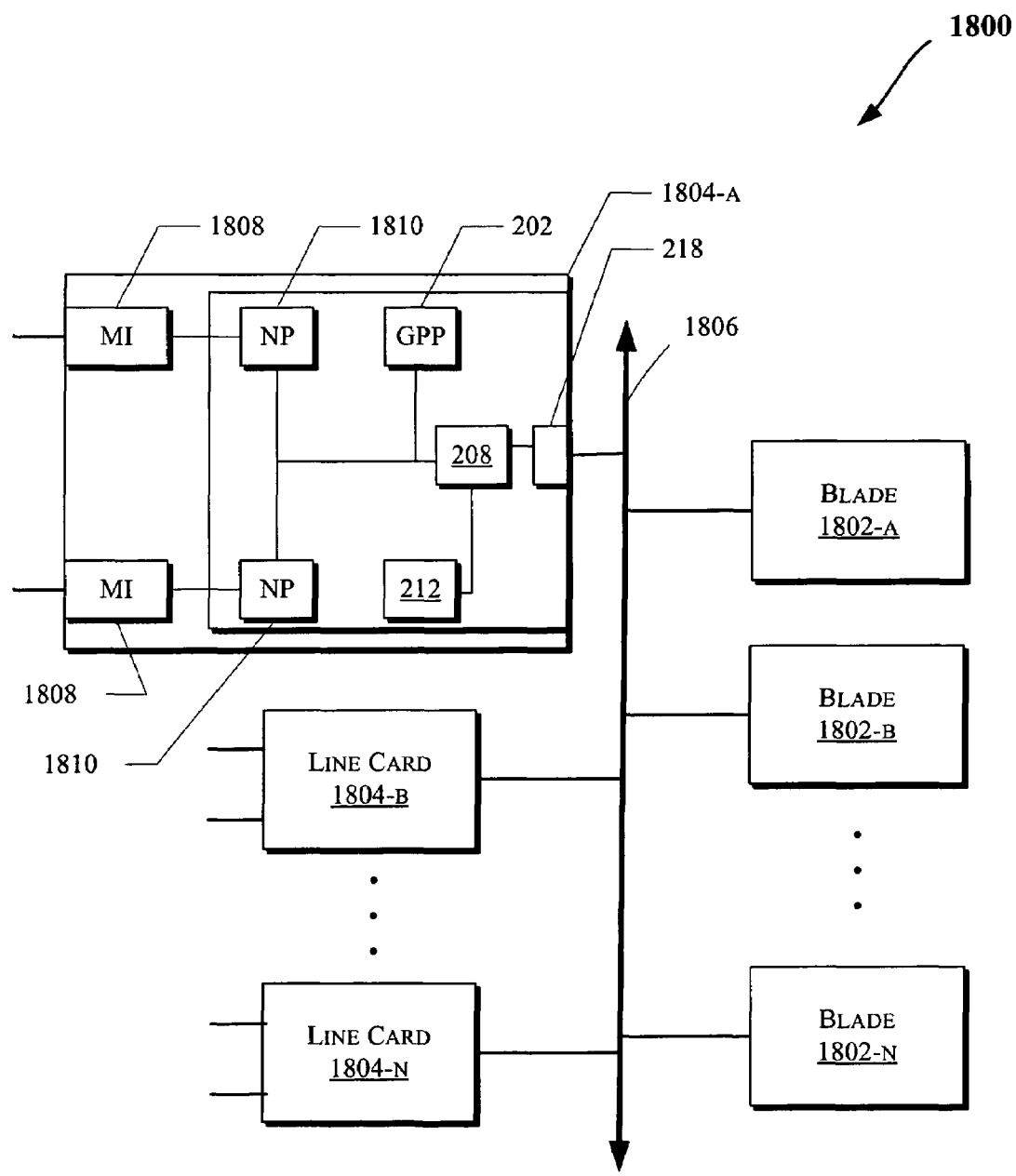
FIG. 18 illustrates an embodiment of a distributed processing platform.

The multi-processor system 200 (of FIG. 2) may be used in a variety of applications. In networking applications, for example, it is possible to closely couple packet processing and general purpose processing for optimal, high-throughput communication between packet processing elements of a network processor and the control and/or content processing of general purpose processors. For example, as shown in FIG. 18, a distributed processing platform 1800 includes a collection of blades 1802-A through 1802-N and line cards 1804-A through 1804-N interconnected by a backplane 1806, e.g., a switch fabric. The switch fabric, for example, may conform to common switch interface (CSIX) or other fabric technologies such as advanced switching interconnect (ASI), HyperTransport, Infiniband, PCI, Ethernet, Packet-Over-SONET (synchronous optical network), RapidIO, and/or Universal Test and Operations PHY (physical) Interface for ATM (UTOPIA). In one embodiment, the line card (1804) may provide line termination and I/O processing.

It may include processing in the data plane (packet processing) as well as control plane processing to handle the management of policies for execution in the data plane. The blades 1802-A through 1802-N may include: control blades to handle control plane functions not distributed to line cards; control blades to perform system management functions such as driver enumeration, route table management, global table management, network address translation and messaging to a control blade; applications and service blades; and/or content processing blades. The switch fabric or fabrics may also reside on one or more blades. In a network infrastructure, content processing may be used to handle intensive content-based processing outside the capabilities of the standard line card functionality including voice processing, encryption offload and intrusion-detection where performance demands are high.

At least one of the line cards 1804, e.g., line card 1804-A, is a specialized line card that is implemented based on the architecture of system 200, to tightly couple the processing intelligence of a general purpose processor to the more specialized capabilities of a network processor. The line card 1804-A includes media interfaces 1808 to handle communications over network connections. Each media interface 1808 is connected to a processor, shown here as network processor (NP) 1810. In this implementation, one NP is used as an ingress processor and the other NP is used as an egress processor, although a single NP could also be used. Other components and interconnections in system 1800 are as shown in FIG. 2. Here the ICH 218 in the system 200 is coupled to the switch fabric 1806. Alternatively, or in addition, other applications based on the multi-processor system 200 could be employed by the distributed processing platform 1800. For example, for optimized storage processing, desirable in such applications as enterprise server, networked storage, offload and storage subsystems applications, the processor 1810 may be implemented as an I/O processor. For still other applications, the processor 1810 may be a co-processor (used as an accelerator, as an example) or a stand-alone control plane processor. Depending on the configuration of blades and line cards, the distributed processing platform 1800 may implement a switching device (e.g., switch or router), a server, a voice gateway or other type of equipment.

In various embodiments of the invention, the operations discussed herein, e.g., with reference to FIGS. 1-18, may be implemented as hardware (e.g., logic circuitry), software, firmware, or combinations thereof, which may be provided as a computer program product, e.g., including a machine-readable or computer-readable medium having stored thereon instructions used to program a computer to perform a process discussed herein. The machine-readable medium may include any suitable storage device such as those discussed with respect to FIGS. 1-2.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
   parsing a received packet, at a parser, to obtain one or more 128-bit addresses of the received packet;
   encoding the one or more addresses, at an address compression block, to reduce a size of the one or more addresses;
   determining, at a classification engine, whether the received packet has a unicast address format or a multicast address format;
   forming a key, at a key formation block, based on the one or more encoded addresses; and
   classifying the received packet, at a packet classification block, based on the key,
   wherein for the unicast address format, the method further comprises determining which one of a first encoding option, a second encoding option, or a third encoding option is utilized to encode the one or more addresses based on one or more classification rules;
   wherein at least one of the first or second encoding options comprises concatenating an encoding type code, a first identifier to be determined based on a first set of one or more bits of a first address, a second set of one or more bits of the first address, and a second identifier, to be determined based on a third set of one or more bits of the first address, to encode the first address; and
   wherein the second encoding option comprises:
   setting the first identifier to an 8-bit identifier for bits 0 through 15 of the first address; setting the second identifier to a 10-bit identifier for bits 64 through 127 of the first address; and
   concatenating an encoding type code, the first identifier, bits 16 through 63 of the first address, and the second identifier to encode the first address.

2. The method of claim 1, wherein classifying the received packet comprises looking up the key in a content addressable memory.

3. The method of claim 1, wherein encoding the one or more addresses comprises encoding a source address and a destination address of the received packet.

4. The method of claim 1, wherein forming the key comprises forming the key based on information from on one or more unencoded fields of the received packet.

5. The method of claim 1, wherein the first encoding option comprises:
   setting the first identifier to a 16-bit identifier for bits 0 through 47 of the first address; setting the second identifier to a 10-bit identifier for bits 64 through 127 of the first address; and
   concatenating an encoding type code, 24 zeros, the first identifier, bits 48 through 63 of the first address, and the second identifier to encode the first address.

6. The method of claim 1, wherein the third encoding option comprises concatenating an encoding type code with bits 0 through 63 of the first address.

7. The method of claim 1, wherein for the multicast address format, the method further comprises:
   setting the first identifier to a 13-bit identifier for bits 16 through 63 of the first address; setting the second identifier to a 10-bit identifier for bits 64 through 95 of the first address;
   concatenating an encoding type code, bits 7 through 15 of the first address, the first identifier, the second identifier, and bits 96 through 127 of the first address to encode the first address.

8. An apparatus comprising:
   a parser to parse a received packet to obtain one or more 128-bit addresses of the received packet;
   an address compression block coupled to the parser to encode the one or more addresses to reduce a size of the one or more addresses;
   a key formation block coupled to the address compression block to form a key based on the one or more encoded addresses; and
   a packet classification block to classify the received packet based on the key,
   wherein the packet is one of a unicast packet or a multicast packet;
   wherein for the unicast address format, it is to be determined which one of a first encoding option, a second encoding option, or a third encoding option is utilized to encode the one or more addresses based on one or more classification rules;
   wherein at least one of the first or second encoding options comprises concatenating an encoding type code, a first identifier to be determined based on a first set of one or more bits of a first address, a second set of one or more bits of the first address, and a second identifier, to be determined based on a third set of one or more bits of the first address, to encode the first address; and
   wherein the second encoding option comprises:
   setting the first identifier to an 8-bit identifier for bits 0 through 15 of the first address; setting the second identifier to a 10-bit identifier for bits 64 through 127 of the first address; and
   concatenating an encoding type code, the first identifier, bits 16 through 63 of the first address, and the second identifier to encode the first address.

9. The apparatus of claim 8, further comprising an incoming port to receive the packet and an outgoing port to send the classified packet to a computer network.

10. The apparatus of claim 8, wherein the packet complies with Internet protocol version 6 (IPv6).

11. The apparatus of claim 8, wherein the one or more addresses are a source address of the received packet or a destination address of the received packet.

12. The apparatus of claim 8, wherein one or more of the parser, address compression block, key formation block, or packet classification block are implemented in a multiprocessor computing system.

13. The apparatus of claim 12, wherein the multiprocessor computing system comprises a symmetrical multiprocessor or an asymmetrical multiprocessor.

14. The apparatus of claim 12, wherein the multiprocessor computing system comprises one or more processor cores utilized to perform one or more operations of the parser, address compression block, key formation block, or packet classification block.

15. The apparatus of claim 12, further comprising one or more content addressable memory devices to store data for one or more of the address compression block or packet classification block.

16. The apparatus of claim 15, wherein the one or more content addressable memory devices comprise one or more ternary content addressable memory.

17. A traffic management device comprising:
   one or more memory devices to store information corresponding to a key; and a multiprocessor computing system coupled to the one or more memory device to:
  parse a received packet to obtain one or more 128-bit addresses of the received packet;
  encode the one or more addresses to reduce a size of the one or more addresses;
  form the key based on the one or more encoded addresses; and
  classify the received packet based on the key,
wherein the packet is one of a unicast packet or a multicast packet;
wherein for the unicast address format, it is to be determined which one of a first encoding option, a second encoding option, or a third encoding option is utilized to encode the one or more addresses based on one or more classification rules;
wherein at least one of the first or second encoding options comprises concatenating an encoding type code, a first identifier to be determined based on a first set of one or more bits of an address, a second set of one or more bits of the first address, and a second identifier, to be determined based on a third set of one or more bits of the first address, to encode the first address; and
wherein the second encoding option comprises:
  setting the first identifier to an 8-bit identifier for bits 0 through 15 of the first address; setting the second identifier to a 10-bit identifier for bits 64 through 127 of the first address; and
  concatenating an encoding type code, the first identifier, bits 16 through 63 of the first address, and the second identifier to encode the first address.

18. The device of claim 17, further comprising a network interface to communicate the packet with a computer network in accordance with Internet protocol version 6 (IPv6).

19. The device of claim 17, wherein the one or more memory devices comprise a ternary content addressable memory (TCAM).

20. The device of claim 17, wherein the one or more memory devices are one or more of a hard drive, RAM, DRAM, SRAM, and SDRAM.

21. A computer-readable medium comprising computer executable instructions, wherein the computer-readable medium comprises:
  stored instructions to parse a received packet to obtain one or more addresses of the received packet;
  stored instructions to encode the one or more 128-bit addresses to reduce a size of the one or more addresses;
  stored instructions to form a key based on the one or more encoded addresses; and
  stored instructions to classify the received packet based on the key,
wherein the packet is one of a unicast packet or a multicast packet;
wherein for the unicast address format, it is to be determined which one of a first encoding option, a second encoding option, or a third encoding option is utilized to encode the one or more addresses based on one or more classification rules;
wherein at least one of the first or second encoding options comprises concatenating an encoding type code, a first identifier to be determined based on a first set of one or more bits of a first address, a second set of one or more bits of the first address, and a second identifier, to be determined based on a third set of one or more bits of the first address, to encode the first address; and
wherein the second encoding option comprises:
  providing an 8-bit first identifier for bits 0 through 15 of the first address;
  providing a 10-bit second identifier for bits 64 through 127 of the first address; and
  concatenating an encoding type code, the first identifier, bits 16 through 63 of the first address, and the second identifier to encode the first address.

22. The computer-readable medium of claim 21, further comprising stored instructions to determine whether the received packet has a unicast address format or a multicast address format.

23. The computer-readable medium of claim 21, further comprising stored instructions to look up the key in a content addressable memory.

* * * * *